United States Patent [19]

Hofmann et al.

[11] Patent Number: 4,804,233
[45] Date of Patent: Feb. 14, 1989

[54] DOUBLE-ROW ANTI-FRICTION BEARING, PARTICULARY FOR WHEELS OF AUTOMOTIVE VEHICLES

[75] Inventors: Heinrich Hofmann, Schweinfurt; Manfred Troster, Bad Kissingen, both of Fed. Rep. of Germany

[73] Assignee: FAG Kugelfischer Georg Schafer (KGaA), Fed. Rep. of Germany

[21] Appl. No.: 916,519

[22] Filed: Oct. 8, 1986

[30] Foreign Application Priority Data

Oct. 16, 1985 [DE] Fed. Rep. of Germany ....... 3536796

[51] Int. Cl.$^4$ ............................................. B60B 27/02
[52] U.S. Cl. ................................. 301/124 R; 384/464; 384/544; 464/906
[58] Field of Search ............... 301/124 R, 124 H, 126, 301/131; 180/258, 259, 73.3, 73.4; 384/499, 504, 505, 506, 543, 544, 589, 464, 494; 464/178, 906

[56] References Cited

U.S. PATENT DOCUMENTS

| | | | |
|---|---|---|---|
| 3,583,511 | 6/1971 | Asberg | 180/259 X |
| 4,010,986 | 3/1977 | Otto | 301/6 E X |
| 4,493,388 | 1/1985 | Welschof et al. | 180/258 |
| 4,606,657 | 8/1986 | Tanaka | 384/504 X |
| 4,668,111 | 5/1987 | Kapaan | 384/544 |

FOREIGN PATENT DOCUMENTS

| | | |
|---|---|---|
| 0065127 | 11/1982 | European Pat. Off. . |
| 2499910 | 8/1982 | France . |
| 1267395 | 1/1972 | United Kingdom . |
| 1298552 | 12/1972 | United Kingdom . |
| 1358842 | 7/1974 | United Kingdom . |
| 8503749 | 8/1985 | World Int. Prop. O. .......... 384/504 |

OTHER PUBLICATIONS

Atz Automobiltechnische Zeitschrift 86 (1984) II-AKF Lagerungseinheiten IM Neuen Saab 9000.

*Primary Examiner*—Robert B. Reeves
*Assistant Examiner*—Russell D. Stormer
*Attorney, Agent, or Firm*—Ostrolenk, Faber, Gerb & Soffen

[57] ABSTRACT

In order to keep at least part of the axial and tilting forces that act on a bearing away from the stub shaft (99) supporting the bearing rollers (3) (5), the inner ring of the bearing is constructed of a removable section (4) that supports a first set of ball bearings (5). A second set of ball bearings (3) is supported directly on the stub shaft. The removable section (14) extends from the free end of the stub shaft (99) to a point located between a first plane containing the ball centers of the second set (3) and a second plane contacted by the outer surfaces of the balls in the second set. The second plane being between the ball centers of the first and second sets.

8 Claims, 1 Drawing Sheet

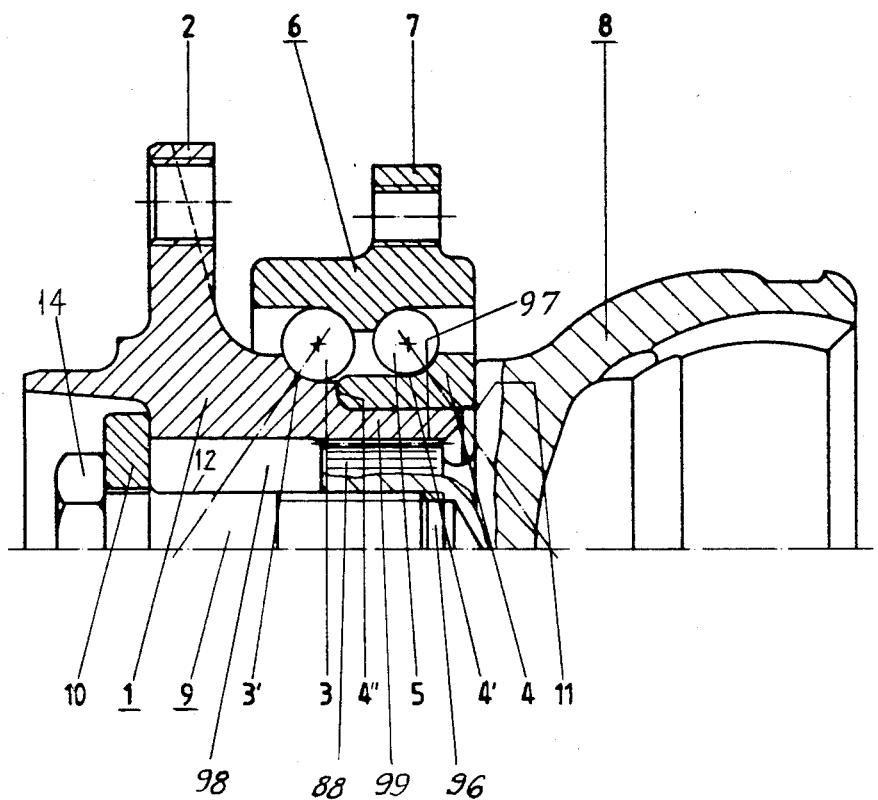

4,804,233

DOUBLE-ROW ANTI-FRICTION BEARING, PARTICULARY FOR WHEELS OF AUTOMOTIVE VEHICLES

BACKGROUND OF THE INVENTION

The present invention relates to an antifriction bearing, and more particularly relates to a construction having two sets of balls mounted on a stub shaft in such a way that the latter is not subjected to all of the axial and tilting forces that are applied to the bearing.

In anti-friction bearings having two sets of axially spaced rollers as disclosed in Federal Republic of Germany OS No. 28 43 597, large axial forces as well as tilting forces frequently occur upon travel around curves. Further, impact forces are often superimposed on the axial and tilting forces. Problems can arise with such bearings, particularly in view of the fact that the inner ring is removable from the hub for assembly reasons. The above noted forces act in a direction to push this inner ring axially off of the hub. Therefore it is necessary to secure this inner ring with an axial fastening that is capable of withstanding high loads.

In the case of automotive vehicles, securement is effected partly by having the inner ring seated with press fit on the stub shaft extension of the hub. Since the stub shaft must be small because of the small cross-section of the inner ring, the far greater part of the inner ring securement is achieved by having the outer face of the removable inner ring bear against a closure part, which is an element of a constant-velocity joint. The constant-velocity joint is then continued through the stub shaft and is fastened on the side of the hub remote from the stub shaft. Thus, this stub shaft must be capable of withstanding major portions of the above-mentioned tilting, axial and impact forces without breaking. This requires a large nut and a stub shaft of large cross-section resulting in a relatively rigid system, so that additional means must be provided in order to secure the nut against becoming loose.

SUMMARY OF THE INVENTION

In order to overcome the foregoing disadvantages of the prior art, the instant invention provides a construction that utilizes a relatively flexible necked-down bolt to secure the bearing elements in operative positions on a stub shaft that projects from a hub and is isolated from at least part of the tilting and axial forces to which the bearing is subjected. The removable bearing ring that supports a set of bearing rollers is force fitted on the stub shaft at the free end thereof and is engaged by a closure nut that is threaded on the necked-down bolt which extends axially through the stub shaft. The flexibility of the necked-down bolt provides an axial elastic clamping action between the bolt and closure nut thereby obviating the need for an additional locking means which would serve to add weight to the bearing unit.

The removable inner ring section extends from the free end of the stub shaft to a location between a first plane containing the centers of balls that are supported directly the stub shaft and a plane that is contacted by the outside of these balls and is located between the first plane and the rollers supported by the movable inner ring section.

At the end of the axial bore through the removable inner ring section, which end is closer to the free end of the stub shaft, there is a rounding radius that approaches zero. In this way, the point of attack of the forces that result from tilting moments are shifted in the direction of the axis of the bearing. This results in a short lever arm through which tilting forces act resulting in reduced loading of the necked-down bolt.

OBJECTS OF THE INVENTION

Accordingly, the primary object of this invention is to provide a bearing having two axially spaced sets of rollers that are operatively supported on a stub shaft in such a manner that the latter is not subjected to all of the axial and tilting forces acting on the bearing.

Another object of this invention is to provide a bearing having two axially spaced sets of rollers, one of which is supported on a removable inner ring section that is force fitted in a stub shaft and extends from the free end thereof to a point opposite the rollers of the set of rollers that is supported directly on the stub shaft.

Still another object of this invention is to provide a bearing of this type in which the rollers in the set closer to the free end of the stub shaft are of smaller diameter than the rollers of the other set of rollers.

BRIEF DESCRIPTION OF THE DRAWING

These objects as well as other objects of this invention shall become readily apparent after reading the following description of the accompanying drawing in which the single FIGURE is a partial cross-section through an axial plane of an anti-friction bearing intended for use with wheels of automotive vehicles.

DETAILED DESCRIPTION OF THE PREFERRED EMBODIMENT

The drawing illustrates a double-row angular-contact ball bearing which includes removable inner ring section 4 force fitted on stub shaft 99 of hub 1. The latter includes attachment flange 2 and rotatably supports outer ring 6 having attachment flange 7. The right end of inner ring section 4 faces closure nut 8 which is in the form of a constant-velocity joint. The latter includes leftward axial extension 88 whose outer surface is provided with parallel axial grooves which engage complementary grooves in the central bore 98 of stub shaft 99 to form splined connection 97 between nut 8 and hub 1. Threaded central bore 96 of nut extension 88 is in threaded engagement with necked-down bolt 12 having head 14, and washer 10 is interposed between bolt head 14 and hub 1.

Balls 3 disposed in a circular array constitute a row of ball bearings that is interposed between outer ring 6 and seat 3' formed directly on the outside of stub shaft 99. Similarly, balls 5 disposed in a circular array constitute a row of ball bearings that is interposed between outer ring section 6 and seating surface 4' on removable inner ring section 4. By having the diameter of balls 5 less than the diameter of balls 3, the radial dimension or thickness of removable sleeve 4 is increased. The latter results in sleeve 4 having increased strength to obtain a more tenacious grip on shaft 99.

A relatively long axial width is obtained for removable ring section 4 by extending the left face 4" thereof up to a region which lies in the space between the plane containing the ball centers of balls 3 in the left set of balls and its right axial envelope plane.

To further improve the loading conditions for necked-down bolt 12 over the improvements obtained by merely extending the axial length of removable ring section 4 to the region of the ball 3 on seat 3', particularly in view of the tilting forces to which the bearing is frequently subjected, edge 11, where the axial bore of ring section 4 meets the right end of section 4, is provided with a radius which approaches zero. That is, the edge 11 is formed with a very small radius. Because of this, these tilting forces act through a relatively short lever arm.

Although the present invention has been described in connection with a preferred embodiment thereof, many variations will now become apparent to those skilled in the art. It is preferred, therefore, that the present invention be limited not by the specific disclosure herein, but only by the appended claims.

What is claimed is:

1. An anti-friction bearing including:
   outer ring means, inner ring means, axially spaced first and second sets of rolling elements interposed between said inner and outer ring means, a hub having an axial projection supporting said inner ring means and having an axial passage, a bolt entered into said passage through one end thereof, and a closure member at the other end of said passage in operative engagement with said bolt;
   said first and second sets of rolling elements being rotatably supported, respectively, on first and second separable sections of said inner ring means;
   said inner ring means including a removable ring section constituting said first section;
   said projection having a free end, said removable ring section having an axial bore into which the projection extends to mount said removable ring section on said projection at said free end, said closure member operatively engaging said removable ring section at one end thereof that is closer to said free end than is the other end of said removable ring section;
   said second set of rolling elements being comprised of balls as rolling elements;
   said other end of said removable ring section being located between first and second planes that are perpendicular to the rotational axis of said bearing;
   said balls having their centers disposed in said first plane;
   said balls having their outer surfaces in contact with said second plane;
   said second plane being interposed between the other end of the removable ring section and the other end of said passage.

2. An anti-friction bearing as set forth in claim 1 in which each rolling element of said first set of rolling elements is of slightly smaller diameter than the diameter of each of said balls; and
   said removable ring section being force fitted on said axial projection.

3. An anti-friction bearing as set forth in claim 1 in which said axial bore extends to said one end of said removable ring section and meets same at an edge that is formed with a radius that approaches zero;
   said closure member engaging said one end at portions thereof adjacent to said edge.

4. An anti-friction bearing set forth in claim 1 in which said first and second planes have a spacing therebetween which is substantially greater than the spacing between said first set of rolling elements and said second plane.

5. An anti-friction bearing including:
   outer ring means, inner ring means, axially spaced first and second sets of rolling elements interposed between said inner and outer ring means, a hub having an axial projection supporting said inner ring means and having an axial passage, a bolt entered into said passage through one end thereof, and a closure member at the other end of said passage in operative engagement with said bolt;
   said first and second sets of rolling elements being rotatably supported, respectively, on first and second separable sections of said inner ring means;
   said inner ring means including a removable ring section constituting said first section;
   said projection having a free end, said removable ring section having an axial bore into which the projection extends to mount said removable ring section on said projection at said free end, said removable ring section being force fitted on said projection, and said closure member operatively engaging said removable ring section at one end thereof that is closer to said free end of said removable ring section;
   said first set of rolling elements being disposed between first and second planes that are perpendicular to the rotational axis of said bearing;
   said second set of rolling elements being positioned between third and fourth planes that are perpendicular to the rotational axis of said bearing;
   said second plane being disposed between said first and third planes, and said third plane being positioned between said second and fourth planes;
   said other end of said removable ring section being located substantially closer to said third plane than to said second plane; and said third and fourth planes having a spacing therebetween that is substantially greater than twice the spacing between said second and third planes.

6. An anti-friction bearing as set forth in claim 5 in which each rolling element of said first set of rolling elements is of slightly smaller diameter than the diameter of each of the rolling elements of said second set of rolling elements; and
   said spacing between said second and third planes is less than half the spacing between the third and fourth planes.

7. An anti-friction bearing as set forth in claim 5 in which said axial bore extends to said one end of said removable ring section and meets same at an edge that is formed with a radius that approaches zero;
   said closure member engaging said one end at portions thereof adjacent to said edge.

8. An anti-friction bearing as set forth in claim 7 in which each rolling element of said first set of rolling elements is of slight smaller diameter than the diameter of each of the rolling elements of said second set of rolling elements.

* * * * *